(12) United States Patent
Boys

(10) Patent No.: US 12,492,814 B1
(45) Date of Patent: Dec. 9, 2025

(54) GAS SKID AND SYSTEMS FOR MINE GAS FLARING OPERATIONS

(71) Applicant: Edward T. Boys, Pomona, MO (US)

(72) Inventor: Edward T. Boys, Pomona, MO (US)

(73) Assignee: Perennial Energy, LLC, West Plains, MO (US)

( * ) Notice: Subject to any disclaimer, the term of this patent is extended or adjusted under 35 U.S.C. 154(b) by 408 days.

(21) Appl. No.: 18/052,626

(22) Filed: Nov. 4, 2022

Related U.S. Application Data

(60) Provisional application No. 63/275,560, filed on Nov. 4, 2021.

(51) Int. Cl.
*F23G 7/08* (2006.01)
*E21B 41/00* (2006.01)

(52) U.S. Cl.
CPC ............ *F23G 7/08* (2013.01); *E21B 41/0071* (2013.01); *F23G 2208/10* (2013.01); *F23G 2900/55* (2013.01)

(58) Field of Classification Search
CPC ............ F23N 2227/04; F23G 2900/55; F23G 2208/10; F23G 7/08; E21B 41/0071
USPC ................................................. 431/5, 18–90
See application file for complete search history.

(56) References Cited

U.S. PATENT DOCUMENTS

| | | | |
|---|---|---|---|
| 3,807,940 A | 4/1974 | Juricek | B01F 25/311 |
| 4,900,244 A | 2/1990 | Keller | F23G 7/08 |
| 5,295,817 A | 3/1994 | Young | F23C 6/047 |
| 5,360,335 A * | 11/1994 | Anderson | F23N 1/002 |
| | | | 431/31 |
| 2013/0167550 A1* | 7/2013 | Snider | F01D 19/00 |
| | | | 60/778 |
| 2016/0305662 A1* | 10/2016 | Nakata | F23C 3/002 |
| 2019/0203933 A1* | 7/2019 | Khan | F23G 7/065 |

OTHER PUBLICATIONS

Honeywell RM7897A relay module brochure (Year: 2018).*
Honeywell RM7800E Relay module installation instructions (Year: 2002).*
Sies et al.(Sies, M. Wahid, M. "Numerical Investigation of the Asymmetrical Vortex Combustor Running on Biogas". Journal of Advanced Research in Fluid Mechanics and Thermal Sciences. Aug. 2020.).
Ignition Temperature of Materials. https://www.tayloredge.com/reference/Science/ignition.html.

* cited by examiner

*Primary Examiner* — Vivek K Shirsat
(74) *Attorney, Agent, or Firm* — Jonathan A. Bay

(57) ABSTRACT

A gas skid is disclosed for mine gas flaring operations to safely move mine gas from existing bore holes or vents to a flare for combustion. The gas skid comprises and/or is supported (attended) by electric power systems, manual control systems, automatic electronic control systems, telecommunication devices, process and flow connections and systems and more.

2 Claims, 6 Drawing Sheets

| Name | Alarm | Shutdown | Comments |
|---|---|---|---|
| E Stop Activated | | X | |
| Power Loss | | X | From EI-1 |
| Flame Loss (Pilot or Main Flame) | | X | Through Burner Controller |
| UV Scanner Failure | | X | Through Burner Controller |
| Burner Controller Fault | | X | From Burner Controller |
| Low CH4 Content in incoming Gas | X | X | Alarm- 40% Shutdown – 35% |
| High O2 Content in incoming gas | X | X | Alarm-2% Shutdown – 5% |
| Open Channel CH4 | | X | |
| Open Channel O2 | | X | |
| High Incoming Gas Temp (Detonation Arrestor DA 301) | X | X | Alarm- 180 F Shutdown-200 F |
| Open Channel Detonation Arrestor Thermocouple | | X | |
| High Detonation Arrestor Temperature DA 302 | X | X | Alarm- 180 F Shutdown-200F |
| Open Channel Detonation Arrestor Thermocouple | | X | |
| High Combustion Temp | X | X | Any of the three TCs. Alarm -1900 F Shutdown 2,000 F |
| High Ambient CH4 (LEL)- Two sensors are provided | X | X | Alarm- 1% Shutdown- 2% |
| LEL Open Channel | | X | |
| High Blower Vibration | X | X | Alarm -0.2 In/In Shutdown- 0.4 In/In |
| Vibration Open Channel | | X | |
| VFD Failure | | X | |
| High/Low inlet Pressure | X | X | TBD |
| High Liquid Level in KOP | X | X | |
| Shutdown Valve FV-301 failure | | X | ZS-301 or 302 not as commanded |

*FIG. 2a.*

| Name | Alarm | Shutdown | Comments |
|---|---|---|---|
| Shutdown Valve FV-302 Failure | | X | ZS-303 or 304 not as commanded |
| Purge blower Overload trip | | X | |
| Purge Blower Not Proven | | X | From PS-401 |
| PS-401 Fault | | X | PS-401 closed when flare is not running. |
| Burner High/Low pressure | X | X | TBD |
| High Gas Flow | X | X | Alarm- 500 SCFM<br>Shutdown -750 SCFM |
| Low Gas Flow | X | X | Alarm- 250 SCFM<br>Shutdown- 100 SCFM |
| High BTU Flow | X | X | Alarm- 18 MM BTU/Hr<br>Shutdown- 18.8 MM BTU/Hr |
| Inlet Pressure Transducer Open Chanel | | X | |
| Burner Pressure Transmitter Open Chanel | | X | |
| Gas Flow Meter Open Chanel | | X | |
| High/Low Ambient Temperature | X | X | TBD based on final component selection |
| High/Low Control Cabinet Temperature | X | X | Low: Alarm 40 F<br>    Shutdown 100 F<br>High: Alarm 100 F<br>    Shutdown 104 F |
| Master Fuel Trip Relay Failure | | X | |
| Inlet Gas Temp Low (GHS-TE-301) | X | X | Alarm- 40 Deg F<br>Shutdown-35 Deg F<br>Alarm Delay- 10 minutes<br>Shutdown delay- 0.5 Minute (If temp is below 35 the PLC will lock out on low temp during 1 minute purge cycle & not try to open valves |
| Flare Gas Temp Low (FLR-TE-303) | X | X | See above |

| Point | Name | Source |
|---|---|---|
| 1 | Inlet Gas / GHS-DA-301 Temperature | GHS-TE-301 |
| 2 | Inlet Pressure/Vacuum | GHS-PT-301 |
| 3 | Valve FV-301 position open/closed | ZS-301 |
| 4 | | ZS-302 |
| 5 | Condensate Level | GHS-LS-701 |
| 6 | Blower Vibration | GHS-VT-1 |
| 7 | Blower Speed | CP-VFD-1 |
| 8 | Blower Amps | CP-VFD-1 |
| 9 | Blower Discharge Temperature | GHS-TE-302 |
| 10 | Control Panel Temperature | CP-TE-401 |
| 11 | Ambient Air Temperature | CP-TE-402 |
| 12 | Gas Oxygen Content | GHS-GAC-301 |
| 13 | Gas Methane Content | GHS-GAC-301 |
| 14 | Valve FV-302 Position | ZS-303 |
| 15 | | ZS-304 |
| 16 | FLR-DA-302 Temperature | FLR-TE-303 |
| 17 | Ambient LEL Grade | FLR-LEL-301 |
| 18 | Ambient LEL Elevated | FLR-LEL-302 |
| 19 | Commanded Louver Position | CP-PLC-1 |
| 20 | Flare Bottom Temp | FLR-TE-501 |
| 21 | Flare Middle Temp | FLR-TE-502 |
| 22 | Flare Top temp | FLR-TE-503 |
| 23 | Gas Flow Rate | GHS-FE-301 |

GAS SKID AND SYSTEMS FOR MINE GAS FLARING OPERATIONS

CROSS-REFERENCE TO PROVISIONAL APPLICATION(S)

This application claims the benefit of U.S. Provisional Application No. 63/275,560, filed Nov. 4, 2021. The foregoing patent disclosure(s) is (are) incorporated herein by this reference thereto.

BACKGROUND AND SUMMARY OF THE INVENTION

The invention relates to mine gas flaring operations and, more particularly, to a gas skid and system(s) therefor for mine gas flaring operations.

It is an object of the invention to situate and safely operate a Gas Skid to safely move mine gas from existing bore holes or vents to a flare for combustion.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 2A is a table of Alarm and Safety Shutdown conditions, tabulating in four columns:
 name of condition;
 indication whether the condition is an Alarm condition;
 further indication whether the condition is also a Shutdown condition; and
 brief general other comment(s);

FIG. 2B is a table which is a continuation of FIG. 2A and listing additional Alarm and Safety Shutdown conditions, tabulating in four columns:
 name of condition;
 indication whether the condition is an Alarm condition;
 further indication whether the condition is also a Shutdown condition; and
 brief general other comment(s);

FIG. 4 is a table providing a list of items which are periodically measured (or their state is noted, eg., louver position) and recorded in a data logging system, which data is used to assist in operation, maintenance and troubleshooting of the system, tabulating in three columns:
 assigned integer value (ie., "point" number);
 description of condition or metric to be measured, or item whose state is recorded; and
 part number of the source for the reporting the measurement or state.

DETAILED DESCRIPTION OF THE PREFERRED EMBODIMENTS

Figure 1:
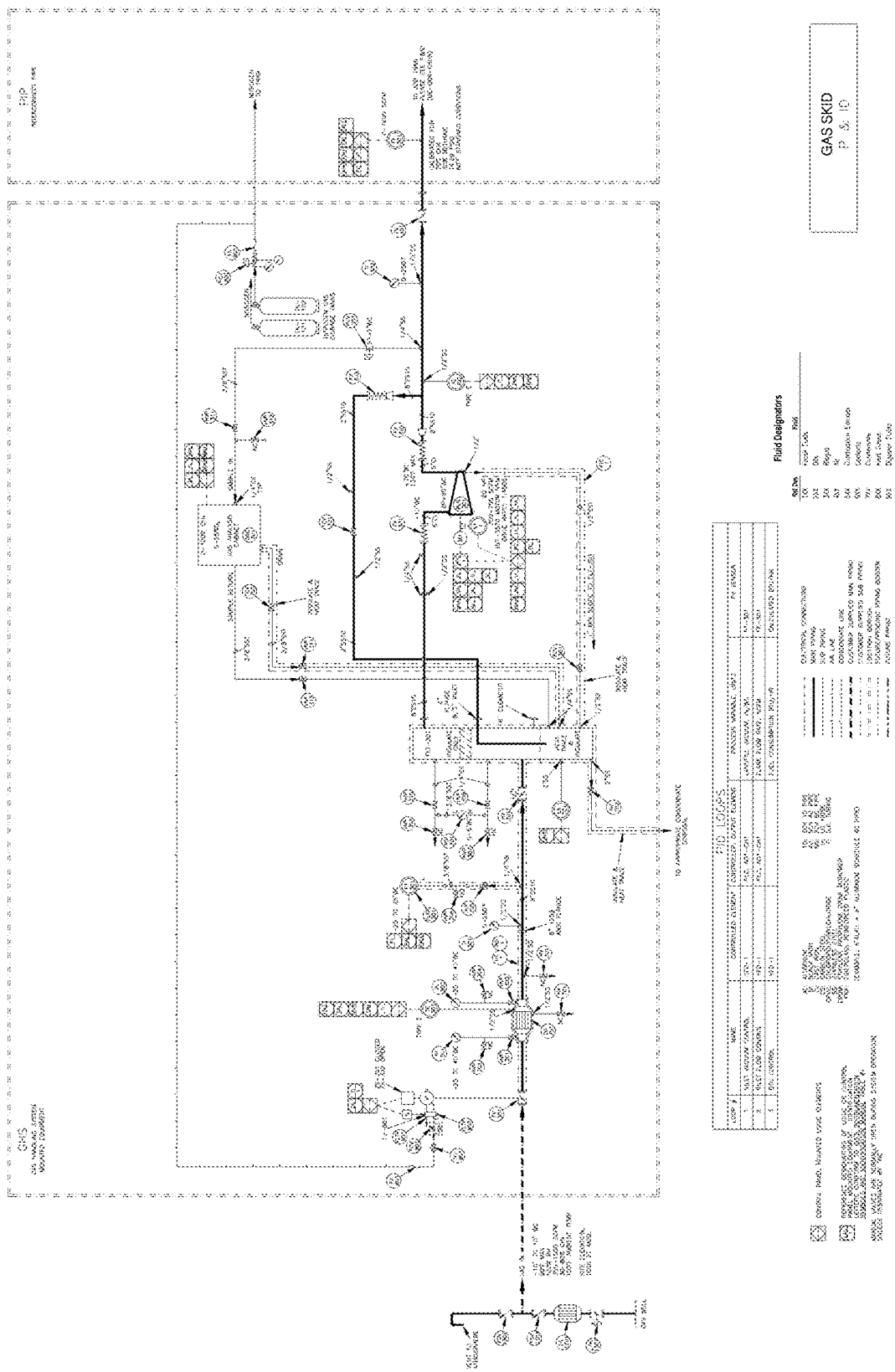
FIG. 1 is a schematic diagram of a gas skid in accordance with the invention—including electric power systems, manual control systems, automatic electronic control systems, telecommunication devices, process and flow connections and systems and the like—for mine gas flaring operations.

With reference to FIG. 1, an introductory overview of functional and operational matters for the gas skid and systems therefor in accordance with the invention for mine gas flaring operations includes the following.

The purpose of this Gas Skid is to safely move mine gas from existing bore holes or vents to a flare for combustion.

The Gas Skid is located a minimum of fifty feet away from any bore hole, vent or other source of methane, and is connected to the bore hole and vent by six inch diameter insulated pipe. The Flare is located a minimum of ten feet from the Gas Skid.

Mine Gas enters the skid through an eight inch diameter API 607 High Performance stainless steel butterfly valve (FV-301). This butterfly valve isolates the gas skid from the mine, and operation is controlled by a Burner Management System only. This valve may be closed by turning the system off, the Master Fuel Trip Relay, or the programmable logic controller ("PLC") as described in the following more particularly below. This valve is pneumatically operated (by a bottled source of pressurized Nitrogen), and fails closed on power or control signal loss. The valve is equipped with a visual beacon, and with visual inspection of the supervisory switches in both the open and closed position. The electrical components on this valve are labeled for use in a Class 1 Division 1 Group D location.

An eight inch diameter 304 stainless steel detonation arrestor (DA-301) is next in the fuel train. It is equipped with a type K thermocouple (TE-301) to measure gas temperature on the downstream (flare) side of the detonation arrestor. If the measured gas temperature exceeds 200° F. (~93° C.) the Master Fuel Relay trips, shutting down all combustion processes and closing stainless steel butterfly valve (FV-301).

A pressure transducer (PT-301) measures the incoming gas pressure. It is a compound range transducer as the inlet gas pressure may change from slightly positive to slightly negative. This pressure transducer is labeled for use in a Class 1 Division 1 Group D location. Output from this transducer is used to ensure that the blower doesn't exert too much vacuum on the borehole, and this signal may be used to control the speed of the blower to hold a constant inlet pressure or vacuum.

A knock out pot (FLT-301) is next in the gas train.

It is an aspect of the invention that this vessel is equipped with a mesh pad to remove any water droplets entrained in the gas stream. It is equipped with a level switch (LS-701) that alarms and/or shuts down the system upon excessive liquid in the tank. The level switch is labeled for use in a Class 1 Division 1 Group D location. A differential pressure gauge (PDI-301) is provided to allow visualization of the pressure drop across the mesh pad. The knock out pot is fabricated from 304L stainless steel. It is equipped with a clean out plate,. I has a two inch (~ 5 cm) manual drain ball valve (HV-701), and is heat traced and insulated. The self-regulating heating cable is suitable for use in a Class 1

Division 1 Group D location. The junction box for the heat tracing is labeled for use in a Class 1 Division 2 Group D location. Power to the heating cable is protected by a GFPE circuit breaker.

The gas blower (BLR-301) comprises a belt-driven, centrifugal gas blower (BLR-301) that has flex fittings (FX-301 & FX-302) on the inlet and outlet side to allow for vibration. The gas blower (BLR-301) is driven by a 60 HP, 480 VAC, 3 phase, totally-enclosed fan-cooled ("TEFC") electric motor that is labeled for use in a Class 1 Division 2 Group D location. A vibration transducer (VT-1), labeled for use in a Class 1 Division 2 Group D location), is provided to ensure that the vibration of the blower assembly is within safe levels. The gas blower raises the pressure of the gas to nominally 2 PSIG (two psi gauge) and thereby sends the mine gas stream to the flare. The speed of the gas blower (and thus the flow rate and pressure rise) is controlled by a Variable Frequency Drive (VFD) located in the control panel.

A Gas Analysis Cabinet (GAC-301) is used to measure the methane & oxygen content of the gas. The system shuts down if the measured methane content is below 35%, or the oxygen content is above 5%.

Utility power at 480 VAC, 3-phase, is supplied to the gas skid at a 250 Amp Panel Board that is used for Lock Out Tag Out. The 480 VAC panel board feeds a 5 KVA 120 VAC single phase transformer that provides control voltage. A 5 HP, 480 VAC, 3-phase motor starter is provided for the flare purge blower.

Ground pads are provided on each end of the skid, these will be connected on site to a 5 Ohm or less ground.

As an aside, standards organizations or government agencies rate one form of Hazardous Locations as Areas within three feet of gas piping: these are classified by rating as Class 1, Division 2 Group D.

An overview of the control panel include the following.

The control panel mounted on the gas skid operates both the gas skid and the remaining flare apparatus. Preferably but without limitation the control panel comprises a UL, CSA and FM approved HONEYWELL® microprocessor-based integrated burner controller (BS-1). Again, it operates the gas skid and the remaining flare apparatus. The control panel programming is preferably fixed and cannot be modified in the field. No hand switches are provided to operate blowers, shutdown valves or solenoids. It is a further aspect of the invention that, the system may only be started by an operator physically on site. The system has no automatic restarts. Any shutdowns must be physically reset by the operator.

The control panel also includes a PLC that also shuts the system OFF if measured values are outside permitted ranges, and controls the gas flow rate to the flare by changing the speed of the blower via the VFD. Blower Speed may be controlled to hold a constant inlet pressure (eg., inlet vacuum pressure), flow rate, or flare firing rate. A touchscreen (YIC 1) provides an overview of the process and displays any alarms or shutdowns. A limited number of control points may be accessed through touchscreen (YIC 1).

An emergency stop button is located on the outer door of the Control Panel. Control Panel switches, lights and displays are located on an inner swing door.

The following are displayed on touchscreen (YIC 1) from devices located on the Gas Skid:
1) Inlet Shutdown Valve (FV-301) position (open-ZS-302/closed-ZS-301);
2) Inlet Gas Temperature (TE-301) (this is also the Detonation Arrestor temperature);
3) Inlet Gas pressure/vacuum (PT-301);
4) Knock Out Pot level switch (LS-701) state (open/closed);
5) Blower (BLR-301) Speed, amperage, and hours;
6) Blower vibration levels (VT-1);
7) Gas Temperature exiting the blower (TE-302); and
8) Methane & Oxygen concentrations in the gas (GAC-301).

The following is displayed on touchscreen (YIC 1) from a device located on the interconnecting pipe between the Gas Skid & Flare:
1) Gas Flow Rate.

The following are displayed on touchscreen (YIC 1) from devices located on the Flare:
1) Flare Shutdown Valve Position (open-ZS-304/closed ZS-303);
2) Gas temperature at Flame Arrestor (TE-303);
3) Ambient Methane percentages (air-methane percentages relative the lower explosive limit ("LEL") therefor) at the combustion/quench air inlet (LEL-1) and at the flare tip (LEL-2);
4) Combustion air inlet position (FCV-401 & -402);
5) Combustion process temperatures (TE-501, -502 & -503);
6) Pilot Valve & ignition transformer state (energized/non energized);
7) Purge Blower (BLR-401) state (off/on) & hours;
8) Proof of Purge Pressure Switch (PS-401) state (open/closed); and
9) Flare Run Hours.

Detonation Arrestor Temperature, Flame Arrestor Temperature, and Combustion temperature are measured with thermocouples connected to the PLC. The Shutdown settings (200° F. (~93° C.) for the Detonation Arrestor & Flame Arrestor, 2,000° F. (~ 1,093° C.) for the combustion chamber) are hard coded into the PLC and are not user adjustable (by users in the field). As noted below, the PLC monitors for open channel conditions, and will de-energize the Master Fuel Trip relay (MFTR) in the event of over temperature or open channel. The MFTR is also de-energized for other shutdown conditions delineated below.

The HONEYWELL® Burner Controller is provided with a display (YIC 2) mounted on the inner swing door. This display provides information from the Burner Controller, and has the reset button for the burner controller. The Burner switch is connected to two self-checking UV scanners located on the flare. A description of the function of these devices is provided further below.

The following Hand Switches are provided:
1) Emergency Stop-located on the exterior door;
2) System OFF/ON;
3) Flare OFF/ON;
4) Flare Start (must be held 10 seconds to start flare); and
5) System Reset.

The Control panel is equipped with a Master Fuel Trip Relay (MFTR) that must be energized in order for the system to run. The MFTR must be energized for any of the following to operate:
1) Inlet Shutdown Valve (FV-301) and Flare Shutdown Valve (FV-302);
2) Gas Blower (BLR-301);
3) Pilot gas solenoids (FV-101 &-102); and
4) Ignition transformer (E/E-1).

The Control Panel transmits data and shutdowns including by over public switched telephone networks, cellular network communications and/or satellite communications.

Aspects of Alarm and Safety Shutdown conditions include the following.

This list includes Alarm and Safety Shutdown conditions for both the Gas Skid and the Flare. Alarms and safety Shutdowns are transmitted by various communications links including a cellular network to alert service personnel, and are logged on an HMI (human machine interface) for review.

Alarms are conditions that need human investigation and intervention before alarms progress into a shutdown. Shutdowns stop the mine gas extraction and combustion process.

FIGS. 2A and 2B tile together and cooperatively comprise a table of Alarm and Safety Shutdown conditions, wherein the table tabulates in four columns:
  name of condition;
  indication whether the condition is an Alarm condition;
  further indication whether the condition is also a Shutdown condition; and
  brief general other comment(s).

Figure 3A:
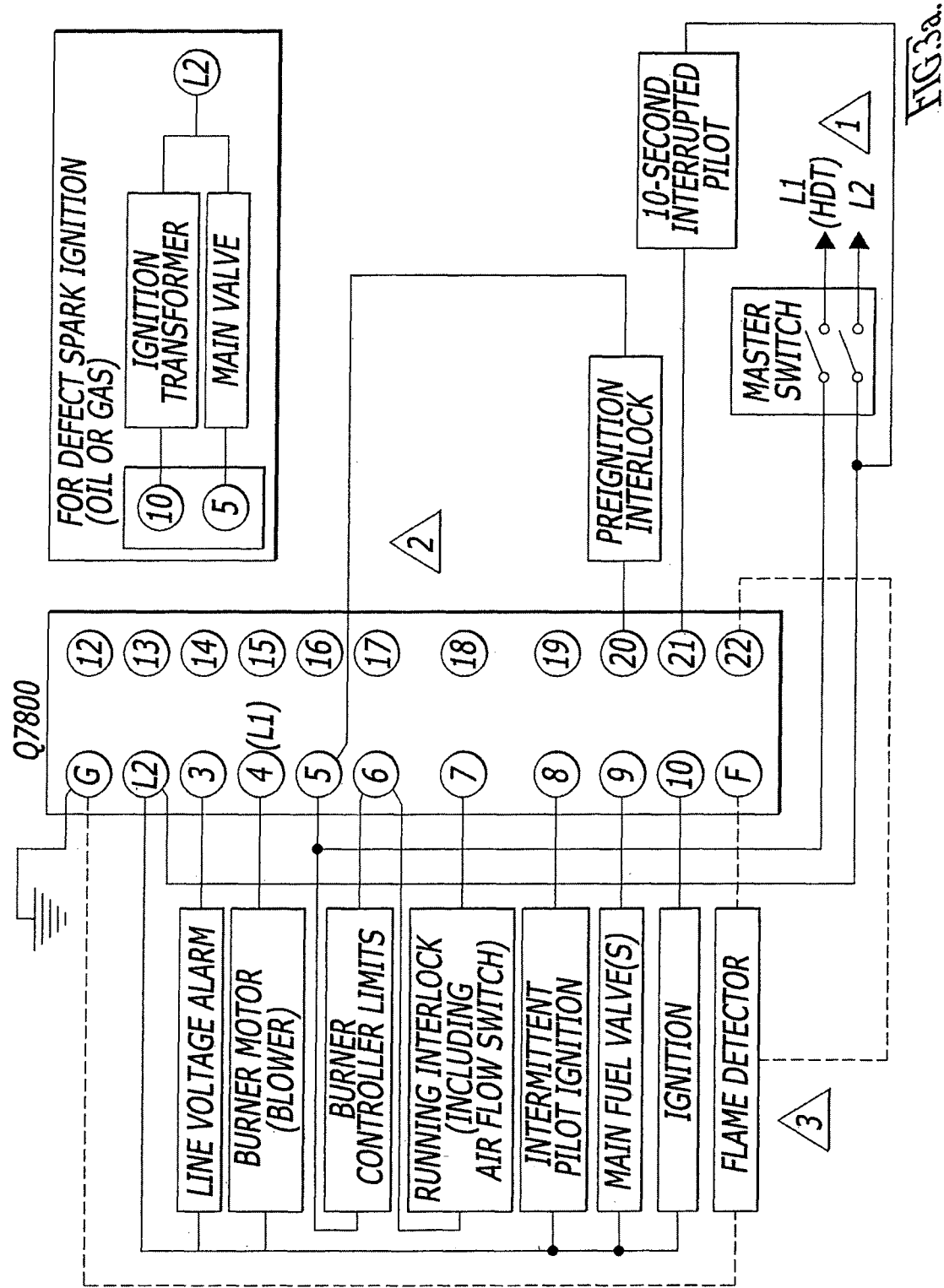
FIG. 3A is a schematic diagram of the wiring of a HONEYWELL® wiring subbase for a HONEYWELL® RM7897A microprocessor-based integrated burner control system for automatically fired gas, oil, or combination fuel single burner applications.
Figure 3B:
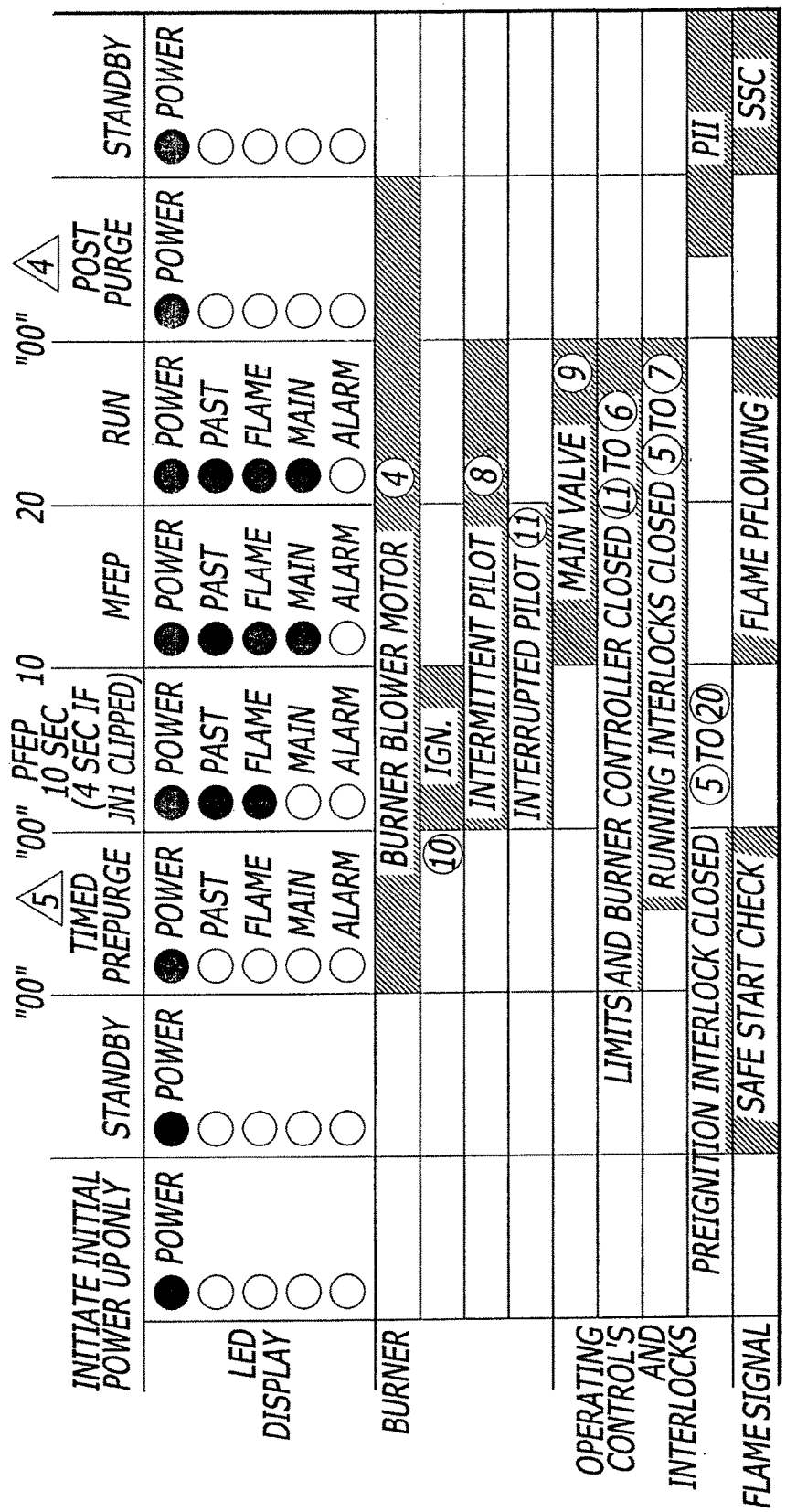
FIG. 3B is a chart that complements FIG. 3A and comprises a sequence chart for a HONEYWELL® RM7897A microprocessor-based integrated burner controller system for automatically fired gas, oil, or combination fuel single burner applications.

FIG. 3B comprises a sequence chart for a HONEYWELL® RM7897A microprocessor-based integrated burner controller system for automatically fired gas, oil, or combination fuel single burner applications. FIG. 3A is a schematic diagram of the wiring of a HONEYWELL® wiring subbase therefor.

The HONEYWELL® RM7897A,C system consist of a relay module, subbase, amplifier, and purge card. Options include keyboard display module (KDM), Data Control-Bus™ Module, remote display mounting, Expanded Annunciator or Modbus module.

Functions provided by the HONEYWELL® RM7897A, C include automatic burner sequencing, flame supervision, system status indication, system or self-diagnostics and troubleshooting.

Given the foregoing, the Control Narrative for the Gas Skid, the Flare and the constituent System(s) therefor comprises the following:
1) No shutdown conditions are present as determined by the PLC. The Combustion Air Inlets (FCV-401 &-402) are held open when the flare is in standby to allow any gases to exfiltrate.
2) The System Switch (HS-1) is turned to ON, the Flare Switch (HS-2) is turned to ON, and the operator presses and holds the Flare Start switch (HS-3) ten seconds. These deliberate actions ensure that the flare will not be started by accident or casual contact with a switch.
3) The HONEYWELL® Burner Switch is signaled to RUN by the PLC by Connecting Terminals 5 and 6 (see eg., FIGS. 3A and/or 3B). If a fault is present at any of these stages, the burner controller stops the process, shuts down the flare and blower, and displays a fault code on the dedicated display (YIC-2).
4) The Burner Controller checks for Pre-ignition interlocks—in this case, that is, that both Shutdown Valves (ZS-301 &-303) are proven closed.
5) The Burner Controller checks for flame using the Self Checking UV Flame Scanners. No flame should be present.
6) The purge cycle starts and runs for 60 seconds. Voltage is present on terminal 4 (see eg., FIGS. 3A and/or 3B), this signals the PLC to start the purge blower by energizing the Purge Blower motor starter, purge is proven by pressure switch (PS-401). The Combustion air inlets are closed during the purge cycle to force all air out the top of the flare. The purge blower moves about 6,000 SCFM (standard cubic feet per minute), and the flare is purged for nominally eight volumes. As this is an atmospheric burner, the blower only runs during pre-purge and post purge. No flame should be present during the purge cycle.
7) The Pilot Flame Establishment Period (PFEP) is 10 seconds. During the PFEP the pilot gas solenoids are open and the ignition transformer is energized. The Pilot Solenoids and ignition transformer are directly energized by the burner controller. At the end of the PFEP the UV Flame scanner must detect flame. The PLC starts the blower ramp up during PFEP to ensure positive gas flow at the beginning of MFEP below.
8) During the 10 second Main Flame Establishment Period (MFEP), the pilot remains energized and the shutdown valves are opened and the blower continues to ramp up. Shutdown Valves are directly controlled by the burner controller. The PLC is used to control the blower speed. The burner lights at low fire and ramps up in a controlled manner by the PLC controlling the blower speed by changing the output frequency in the VFD. At the end of the MFEP, the pilot is de-energized and the UV flame scanner must detect flame from combustion at the main burners.
9) The flare continues to run until the PLC removes the RUN signal or a shutdown occurs. Gas flow to the flare can be controlled in response to the inlet pressure (Vacuum control), gas flow rate (Flow Control) or total BTU loading to the flare (BTU Control). Flare temperature is controlled by the PLC by adjusting the position of the combustion air inlets (ie., more air cools the flare).

It is an aspect of the invention to provide automatically electronically-operated Data Logging functionality for the Gas Skid, the flare and the constituent system(s) therefor. In this regards, FIG. 4 is a table providing a list of items which are periodically measured (or their state is noted, eg., louver position) and recorded in a data logging system, which data is used to assist in operation, maintenance and troubleshooting of the system, tabulating in three columns:
  assigned integer value (ie., "point" number);
  description of condition or metric to be measured, or item whose state is recorded; and
  part number of the source for the reporting the measurement or state.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method for practicing mine gas flaring operations with a gas skid, a flare, and blower including electric power systems, manual control systems, automatic electronic control systems, telecommunication devices, process and flow connections and systems; said method comprising the steps of:
  1) at a beginning when NO shutdown conditions are present as determined by the programmable logic controller ("PLC"), Combustion Air Inlets are held open when the flare is in standby to allow any gases to exfiltrate;
  2) a System Switch is turned to ON, a Flare Switch is turned to ON, and an operator presses and holds a Flare Start switch for ten seconds, whereby these deliberate actions ensure that the flare will not be started by accident or casual contact with a switch;
3) a Burner Switch is signaled to RUN by the PLC, and if a fault is present at this stage, the burner controller stops the process, shuts down the flare & blower, and displays a fault code on a display;
4) a Burner Controller checks for Pre-ignition interlocks wherein Shutdown Valves are proven closed;
5) the Burner Controller checks for flame using Self Checking Ultra-Violet (UV) Flame Scanners, whereby no flame should be present at this stage;
6) a purge cycle starts and runs for sixty seconds wherein the PLC is signaled to start a purge blower by energizing a Purge Blower motor starter, and wherein purge is proven by a pressure switch, the Combustion air inlets are closed during the purge cycle to force all air out the top of the flare, the purge blower moves a volume of air over a period of time such that the flare is purged for nominally eight volumes;
7) a Pilot Flame Establishment Period (PFEP) comprising 10 seconds during which pilot gas solenoids are opened and an ignition transformer is energized, wherein the Pilot Solenoids and ignition transformer are directly energized by the burner controller, and wherein at the end of the PFEP the UV Flame scanner must detect flame, and if so the PLC starts the blower ramp up during PFEP to ensure positive gas flow at the beginning of step 8 below;
8) during a 10 second Main Flame Establishment Period (MFEP), the pilot remains energized, the shutdown valves are opened, and the blower continues to ramp up, wherein the Shutdown Valves are directly controlled by the burner controller, the PLC is used to control the blower speed, wherein the burner lights at low fire and ramps up in a controlled manner by the PLC controlling the blower speed by changing the output frequency in the VFD a Variable Frequency Drive (VFD), and wherein at the end of the MFEP, the pilot is de-energized and the UV flame scanner must detect flame from combustion at the main burners; and
9) the flare continues to run until the PLC removes the RUN signal or a shutdown occurs, wherein the Gas flow to the flare can be controlled in response to an inlet pressure Vacuum control, a gas flow rate Flow Control or a total BTU loading flare BTU Control, and wherein Flare temperature is controlled by the PLC by adjusting the position of the combustion air inlets.

2. A method for practicing mine gas flaring operations with a gas skid, a flare, and blower including electric power systems, manual control systems, automatic electronic control systems, telecommunication devices, process and flow connections and systems; said method comprising the steps of:

1) at a beginning when NO shutdown conditions are present as determined by the automatic electronic control system ("AECS"), Combustion Air Inlets are held open when the flare is in standby to allow any gases to exfiltrate;
2) a System Switch is turned to ON, a Flare Start Switch is turned to ON, and an operator presses and holds a Flare Start switch for a multi-second period of time, whereby these deliberate actions ensure that the flare will not be started by accident or casual contact with the Flare Start switch;
3) a Burner Switch is signaled to RUN by the AECS, and if a fault is present at this stage, the AECS stops the process, shuts down the flare and blower, and displays a fault code on a display;
4) the AECS checks for Pre-ignition interlocks wherein Shutdown Valves are proven closed;
5) the AECS checks for flame using Self Checking Ultra-Violet (UV) Flame Scanners, whereby no flame should be present at this stage;
6) a purge cycle starts and runs for sixty seconds wherein the AECS is signaled to start a purge blower by energizing a Purge Blower motor starter, and wherein purge is proven by a pressure switch, the Combustion air inlets are closed during the purge cycle to force all air out the top of the flare, the purge blower moves a volume of air over a period of time such that the flare is purged for nominally multiple volumes;
7) a Pilot Flame Establishment Period (PFEP) comprising the multi-second period of time during which pilot gas solenoids are opened and an ignition transformer is energized, wherein the Pilot Solenoids and ignition transformer are directly energized by the AECS, and wherein at the end of the PFEP the UV Flame scanner must detect flame, and if so the AECS starts the blower ramp up during PFEP to ensure positive gas flow at the beginning of step 8 below;
8) During a multi-second Main Flame Establishment Period (MFEP), the pilot remains energized, the shutdown valves are opened, and the blower continues to ramp up, with the AECS controlling blower speed, wherein the burner lights at low fire and ramps up in a controlled manner by the AECS controlling the blower speed, and wherein at the end of the MFEP, the pilot is de-energized and the UV flame scanner must detect flame from combustion at the main burners; and
9) the flare continues to run until the AECS removes the RUN signal or a shutdown occurs, wherein the Gas flow to the flare can be controlled in response to an inlet pressure Vacuum control, a gas flow rate Flow Control or a total BTU loading flare BTU Control, and wherein Flare temperature is controlled by the AECS by adjusting the position of the combustion air inlets.

* * * * *